Feb. 26, 1924.

J. F. FLAHERTY 1,484,878

GRINDING MACHINE

Filed July 12, 1920

Inventor
JOHN F. FLAHERTY
by B. M. Kent
Attorney

Patented Feb. 26, 1924.

1,484,878

UNITED STATES PATENT OFFICE.

JOHN F. FLAHERTY, OF TOLEDO, OHIO, ASSIGNOR TO THE BOCK BEARING COMPANY, OF TOLEDO, OHIO, A CORPORATION OF OHIO.

GRINDING MACHINE.

Application filed July 12, 1920. Serial No. 395,540.

*To all whom it may concern:*

Be it known that I, JOHN F. FLAHERTY, a citizen of the United States, and a resident of Toledo, county of Lucas, State of Ohio, have invented certain new and useful Improvements in Grinding Machines, of which the following is a specification.

This invention relates to grinding machines and similar apparatus, and has for its principal object the provision of an improved type of shaft bearing, which will permit accurate and extremely close adjustments of the bearing without a tendency to bind the shaft.

Other objects of the invention and the features of novelty will be apparent from the following description, taken in connection with the accompanying drawings, in which:—

Figure 1:
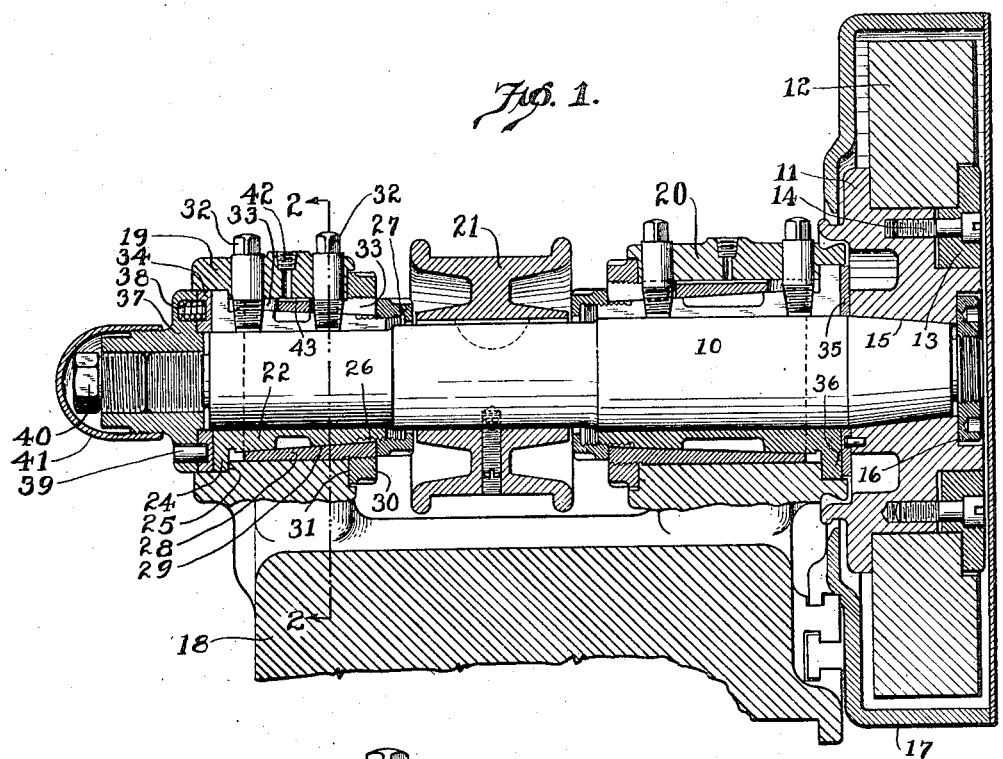
Figure 2:
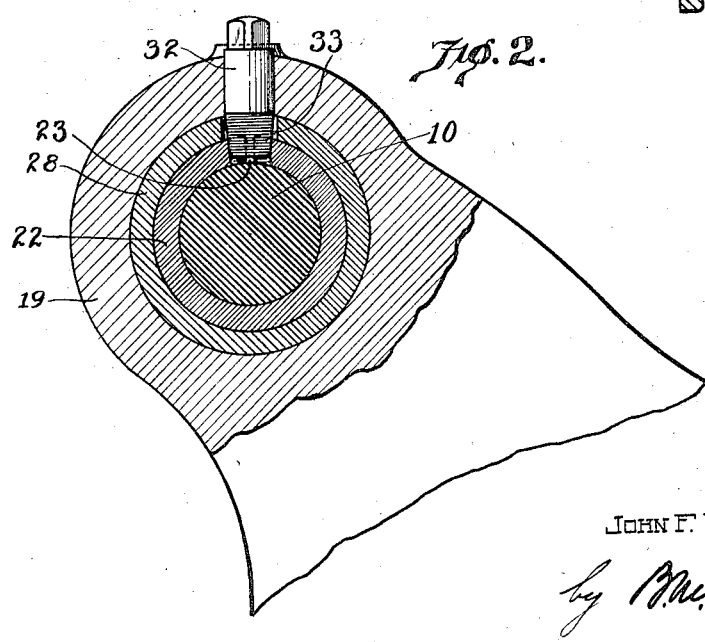

Figure 1 is a longitudinal section through the bearings of a grinding wheel shaft, embodying my invention; and Fig. 2 is a transverse section on the line 2—2 of Fig. 1.

Referring to the drawings, 10 indicates a shaft on one end of which is mounted a hub member 11 for the grinding wheel 12, the latter being secured by a plate 13 and screws 14. The hub member 11 has the usual taper fit on the shaft 10, as indicated at 15, and is secured thereon by a nut 16. The usual protective housing for the wheel 12 is indicated at 17. A housing or bracket 18 carries the bearings 19 and 20, which embody the invention. Since both of the bearings illustrated are of the same general construction, a description of one will be sufficient for an understanding of the invention. A driving pulley 21 is keyed to the shaft 10 between the bearings 19 and 20.

Each of the bearings comprises a bearing proper 22, which supports the shaft and is split at one point in its circumference, as indicated at 23 in Fig. 2. At one end of the bearing 22, is a flange 24 which abuts a shoulder 25 on the housing, for the purpose of holding the bearing against endwise movement in one direction. The opposite end of the bearing 22 is provided with external threads 26 for the nut 27, which bears against the end of an adjusting sleeve 28. The outer surface of the bearing 22 is made conical, as indicated at 29, and the sleeve 28 has a conical bore to fit the surface 29. A nut 30 has a threaded connection with one end of the sleeve 28 and bears against the end 31 of the part 19. One or more adjustable members 32 (two being preferably used) extend through the part 19 and have tapered threaded inner ends which engage correspondingly tapered and threaded openings in the bearing 22, at the split therein. Slots 33 are provided in the sleeve 28 to permit the passage of the members 32 therethrough, these slots being elongated to permit axial adjustment of the sleeve 28.

When the nut 30 is loosened, the sleeve 28 may be moved to the left on the bearing 22, by means of the nut 27, as will be thoroughly understood from Fig. 1, and this relative adjustment of the sleeve 28 and bearing 22 will cause a contraction of the bearing on the shaft 10, the split 23 permitting such contraction. However, the members 32 definitely space the sides of the split 23 so that, in order to contract the split in the bearing 22, it is necessary to back out the members 32 to correspond with the amount of adjustment desired. Thus, when wear occurs between the shaft 10 and the bearing 22, the latter may be contracted to make up for the wear, but the amount of such contraction may be definitely, although variably limited by adjustment of the members 32, so that binding of the shaft in the bearing 22 may be avoided. When the adjustment is completed, the nut 30 is tightened.

For the purpose of eliminating end play in the shaft 10, a thrust ring 34 may be provided to bear against the outer surface of the flange 24 and a corresponding ring 35 may be provided at the opposite end of the shaft to bear against the end surface of the bearing 36. A nut 37 is arranged on the end of the shaft 10 and springs 38 are arranged in suitable recesses in the ring 34 and the nut 37 to yieldingly compensate for wear on the thrust rings and expansion of shaft 10, due to the heat generated in running. A dowel 39 connects the nut 37 with the ring 34 so as to cause the two to rotate together and a screw 40 serves to lock the nut 37 in position on the end of the shaft 10. A cap 41, having a screw threaded connection with the nut 37, serves to cover the head of the screw 40.

It will be noted that, in adjusting the sleeve 28 by means of the nut 27, the engagement of the flange 24 with the shoulder 25 holds the bearing 22 against endwise movement and, therefore, it is possible to make the adjustment without disturbing the axial adjustment of the shaft 10. Moreover, if the sleeve 28 is moved too far so as to cause a slight binding of the shaft 10, this may be relieved by screwing in the members 32, so as to open the split 23.

The members 32 serving, as they do, to definitely space the sides of the split 23, insure against binding the shaft when the bearing 22 expands, due to heat generated in running the shaft, by causing this expansion to act outwardly instead of circumferentially.

Any suitable means for lubricating the bearings may be provided, and for its purpose, I have shown a duct 42 which feeds an axially extending groove 43 in the outer surface of the sleeve 28, this groove permitting the lubricant to flow through the slots 33 and the split 29 to the interior of the bearing 22.

While I have illustrated and described what I consider a preferred embodiment of my invention, it will be understood that various changes may be made in the details of construction shown, without departing from the principles of the invention, as defined in the appended claims.

Having thus described my invention, what I claim is:—

1. In apparatus of the class described, the combination of a shaft, a split bearing therefor, and means for adjusting said bearing comprising an axially adjustable conical sleeve on the exterior of the bearing to contract the latter, and an adjustable wedge member in the split of the bearing to variably limit the contraction of the split.

2. In apparatus of the class described, the combination of a shaft, a split bearing therefor having a conical exterior, a conical sleeve surrounding said bearing and adapted to be adjusted axially to contract the bearing and a wedge member in the split of the bearing to variably limit the contraction of the split.

3. In apparatus of the class described, the combination of a shaft, a split bearing therefor having a conical exterior, a concial sleeve surrounding said bearing, means for adjusting said sleeve axially on said bearing to contract the bearing, and a tapered screw in the split of the bearing to variably limit the contraction of the split.

4. In apparatus of the class described, the combination of a shaft, a split bearing therefor, means for holding said bearing against axial movement, means on said shaft cooperating with said bearing to hold the shaft against axial movement, means cooperating with the exterior of said bearing to contract the latter, and a wedge member adjustably arranged in the split of the bearing to positively limit the contraction of the split.

5. In apparatus of the class described, the combination of a shaft, a split bearing therefor, means for holding said bearing against axial movement, means on said shaft cooperating with said bearing to hold the shaft against axial movement, a conical sleeve cooperating with the exterior of said bearing to contract the latter, and a member adjustably arranged in the split of the bearing to positively limit the contraction of the split.

6. In apparatus of the class described, the combination of a shaft, a split bearing therefor, means for holding said bearing against axial movement, means on said shaft cooperating with said bearing to hold the shaft against axial movement, a conical sleeve surrounding said bearing, a nut cooperating with said bearing and said sleeve to move the sleeve axially on the bearing to contract the latter, and means adjustably arranged in the split of the bearing to positively limit the contraction of the split.

7. In apparatus of the class described, the combination of a shaft, a split bearing therefor, means for holding said bearing against axial movement, means for holding said shaft against axial movement, a conical sleeve surrounding said bearing, means for moving said sleeve axially on said bearing to contract the latter without disturbing the axial position of said shaft, and means arranged in the split of said bearing to positively limit the contraction of the split.

8. In apparatus of the class described, the combination of a shaft, a split bearing therefor, means for holding said bearing against axial movement, means for holding said shaft against axial movement, a conical sleeve surrounding said bearing, means for moving said sleeve axially on said bearing to contract the latter without disturbing the axial position of said shaft, and a tapered screw-threaded member having a threaded connection with said bearing in the split thereof adapted to positively limit the contraction of the split.

In testimony whereof I affix my signature.

JOHN F. FLAHERTY.